No. 685,103. Patented Oct. 22, 1901.
C. CHRISTIANSSON.
MACHINE FOR USE IN MAKING HOLLOW ARTICLES OF GLASS.
(Application filed Jan. 13, 1900.)

(No Model.) 5 Sheets—Sheet 1.

WITNESSES:

INVENTOR
Christian Christiansson
BY
ATTORNEY

No. 685,103. Patented Oct. 22, 1901.
C. CHRISTIANSSON.
MACHINE FOR USE IN MAKING HOLLOW ARTICLES OF GLASS.
(Application filed Jan. 13, 1900.)
(No Model.) 5 Sheets—Sheet 2.

WITNESSES:
J. W. Wiman
Peter A. Ross

INVENTOR
Christian Christiansson
BY
Henry Connett
ATTORNEY

No. 685,103. Patented Oct. 22, 1901.
C. CHRISTIANSSON.
MACHINE FOR USE IN MAKING HOLLOW ARTICLES OF GLASS.
(Application filed Jan. 13, 1900.)
(No Model.) 5 Sheets—Sheet 3.
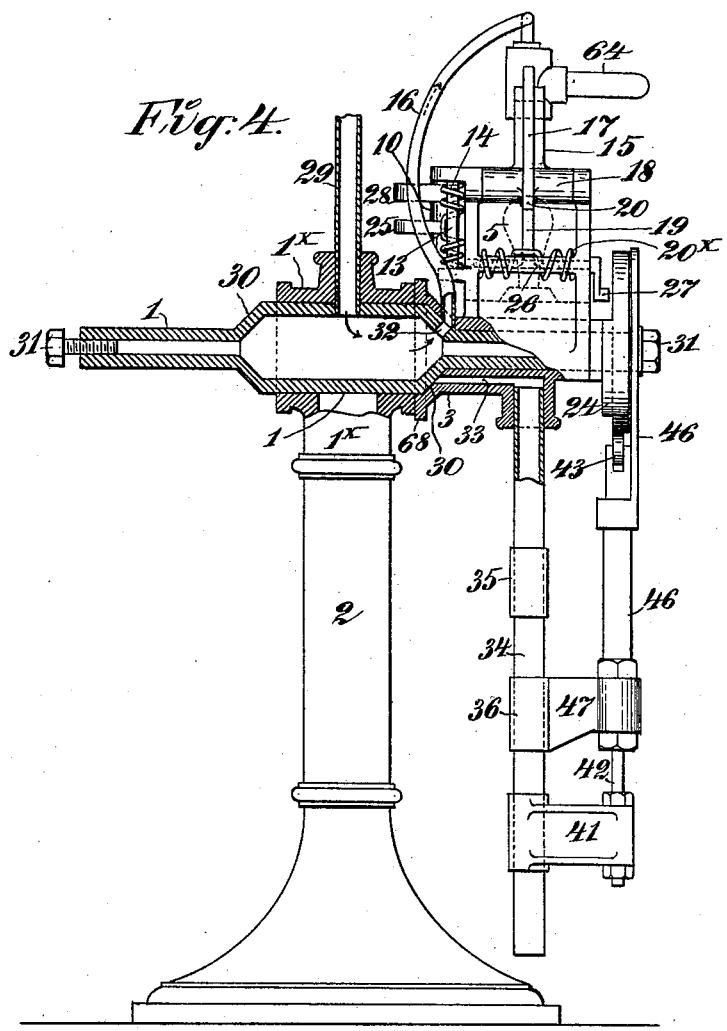
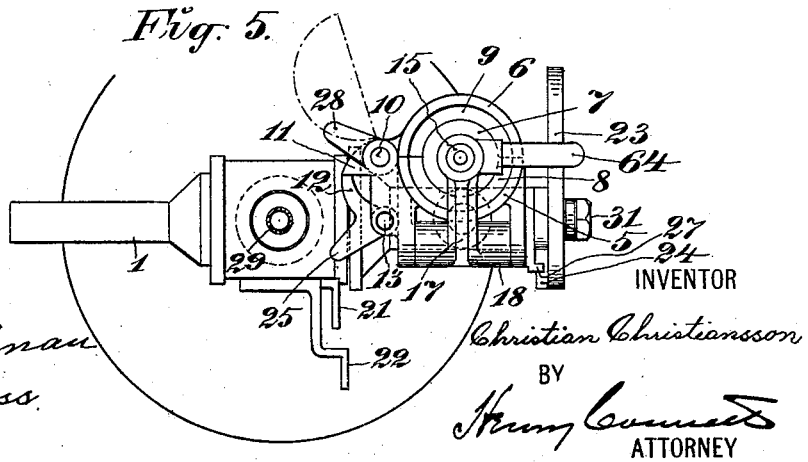
WITNESSES:
INVENTOR
Christian Christiansson
BY
ATTORNEY No. 685,103. Patented Oct. 22, 1901.
C. CHRISTIANSSON.
MACHINE FOR USE IN MAKING HOLLOW ARTICLES OF GLASS.
(Application filed Jan. 13, 1900.)
(No Model.) 5 Sheets—Sheet 4.
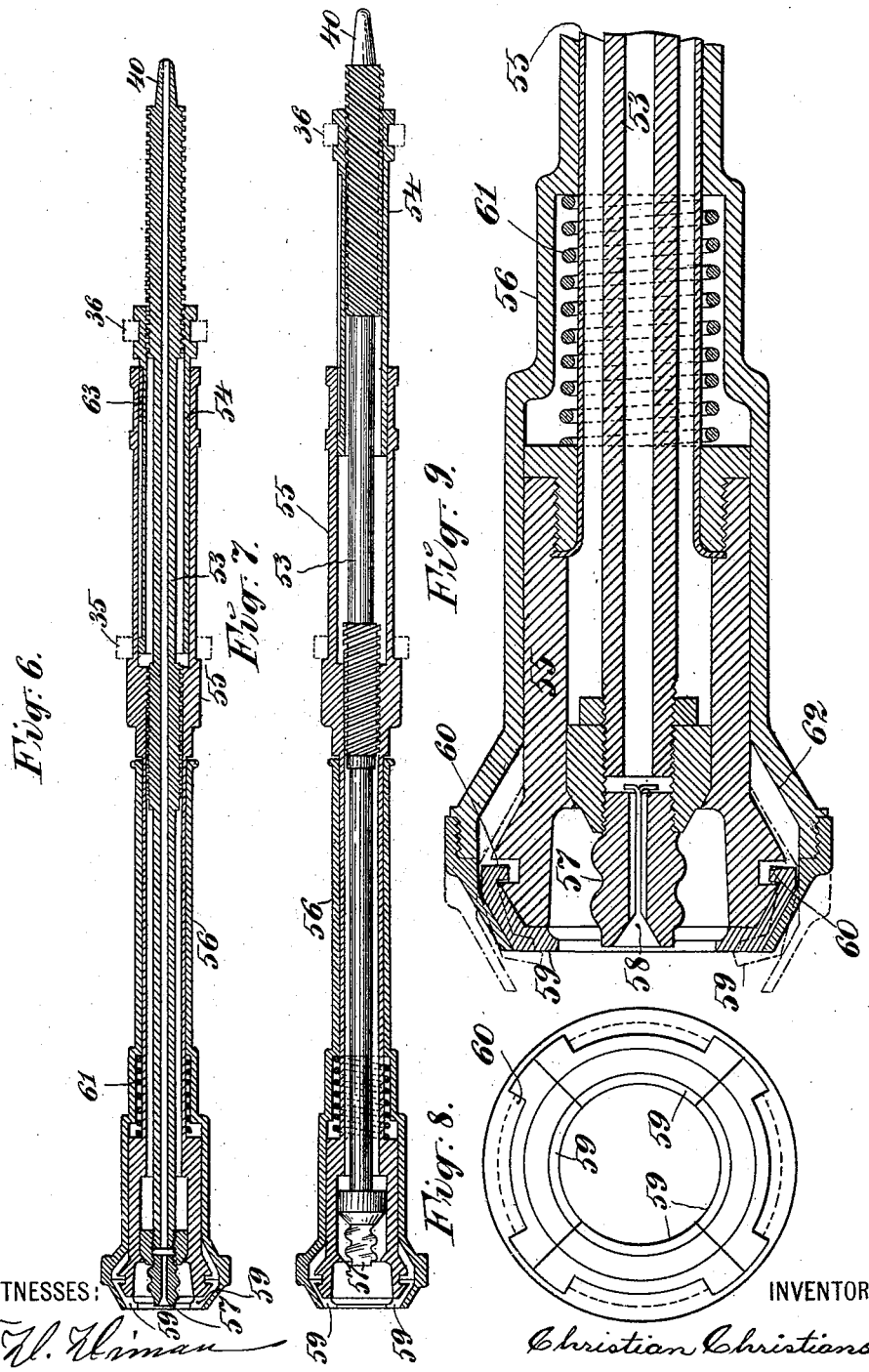
WITNESSES:
INVENTOR
Christian Christiansson
BY
ATTORNEY No. 685,103. Patented Oct. 22, 1901.
C. CHRISTIANSSON.
MACHINE FOR USE IN MAKING HOLLOW ARTICLES OF GLASS.
(Application filed Jan. 13, 1900.)
(No Model.) 5 Sheets—Sheet 5.
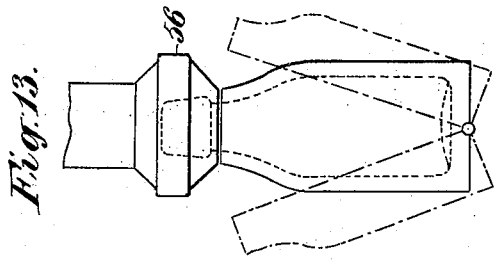
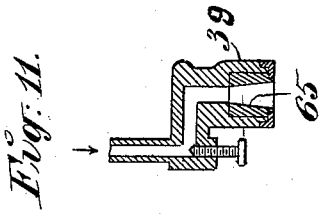
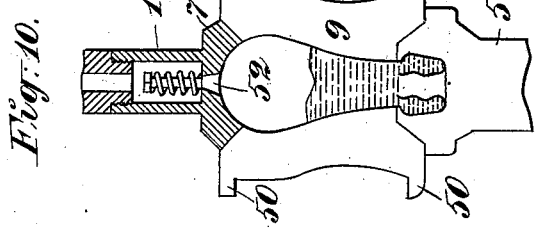
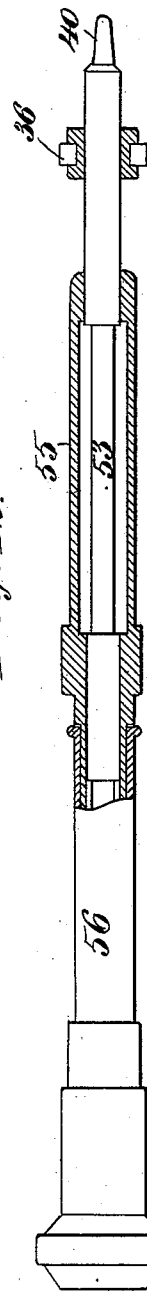
WITNESSES:
J. W. Hinman
Peter A. Ross
INVENTOR
Christian Christiansson
BY
Henry Connett
ATTORNEY
THE NORRIS PETERS CO., PHOTO-LITHO., WASHINGTON, D. C.

UNITED STATES PATENT OFFICE.

CHRISTIAN CHRISTIANSSON, OF SURTE, NEAR GOTHENBURG, SWEDEN, ASSIGNOR TO SURTE AKTIEBOLAG, OF SURTE, NEAR GOTHENBURG, SWEDEN.

MACHINE FOR USE IN MAKING HOLLOW ARTICLES OF GLASS.

SPECIFICATION forming part of Letters Patent No. 685,103, dated October 22, 1901.

Application filed January 13, 1900. Serial No. 1,301. (No model.)

*To all whom it may concern:*

Be it known that I, CHRISTIAN CHRISTIANSSON, a subject of the King of Sweden and Norway, residing at Surte, near Gothenburg, in the Kingdom of Sweden, have invented certain Improvements in Machines for Use in Making Hollow Articles of Glass, of which the following is a specification.

This invention relates to machines employed in the manufacture of hollow articles from glass; and it is embodied in a machine adapted for producing mechanically a partly-finished hollow article termed an "ingot." This ingot, which is connected to a blowpipe, is then removed from the divided or sectional primary mold of the machine to a finishing-mold and there finished by hand. In the operation of the machine compressed air is introduced into the ingot-mold by two distinct operations, one for forcing the molten glass into the contracted portion of the mold to form the rim or head of the ingot and the other for forming the cavity in the ingot. The air for these two operations is admitted through different channels and the devices for effecting this admission of air form an important part of the novel features of the invention. These novel features will be hereinafter carefully defined in the claims.

Figure 1:
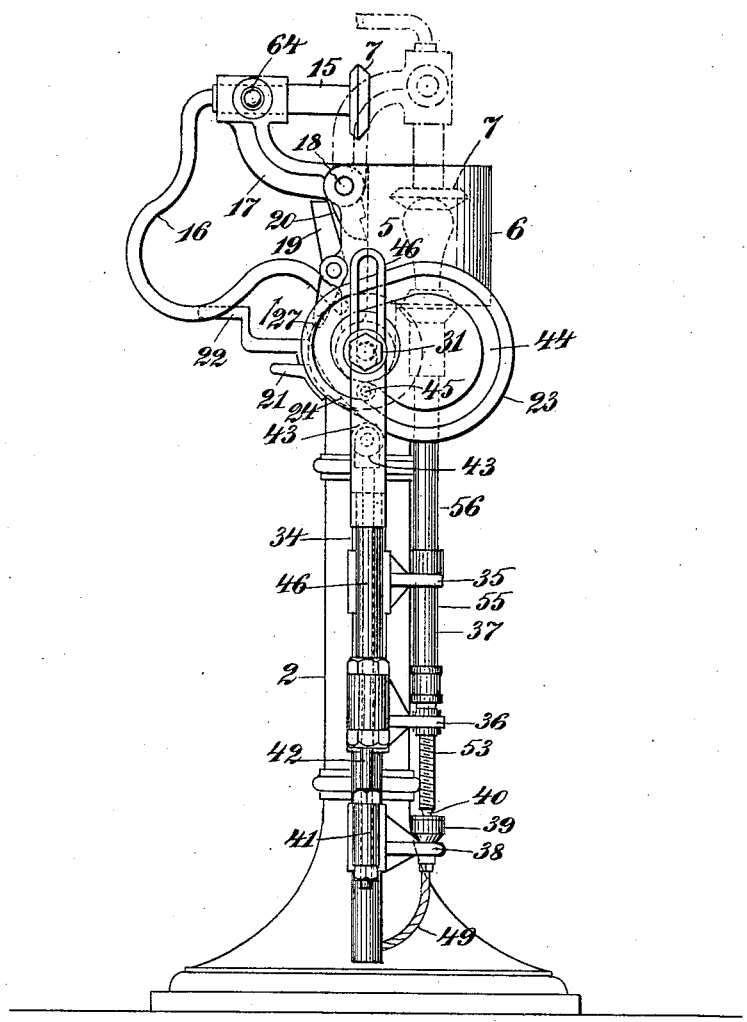
Figure 2:
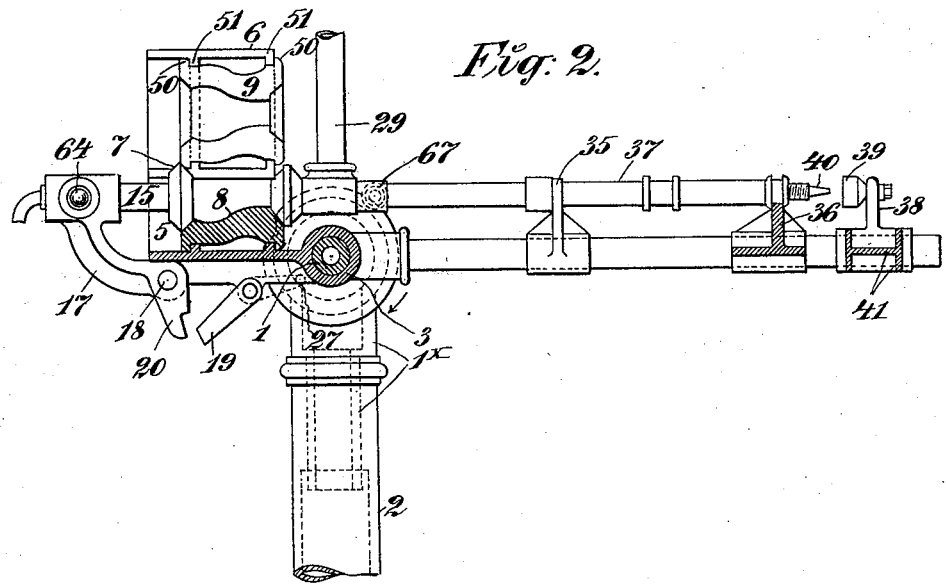
Figure 3:
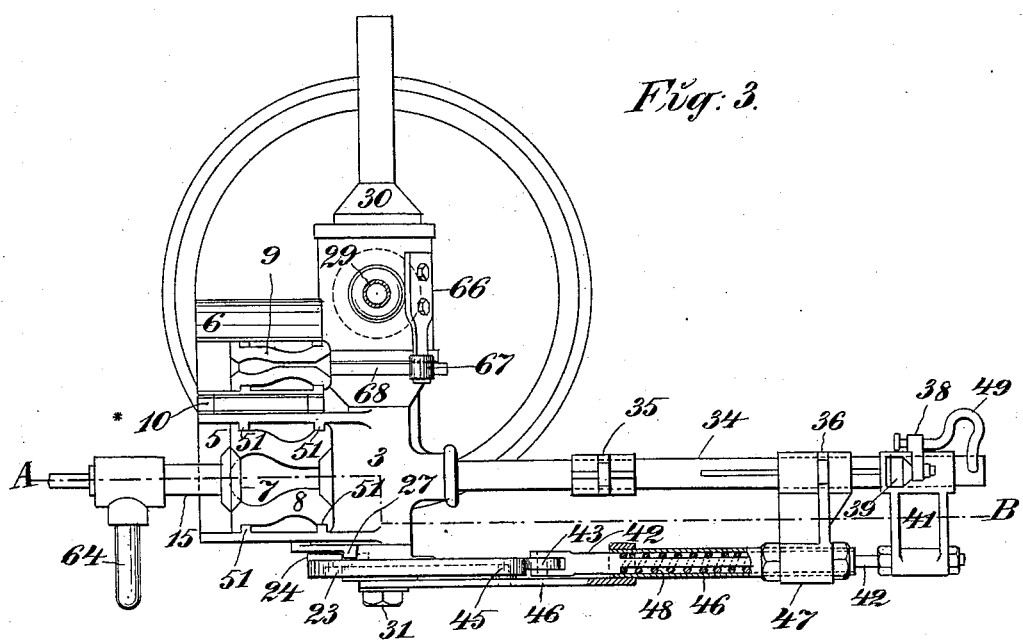

In the accompanying drawings, which illustrate an embodiment of the invention, Figure 1 is a front elevation of the machine with the axis of the mold in a vertical position. Fig. 2 is a sectional front view of a part of the machine, showing the axis of the mold horizontal. The plane of the section is indicated by the line A B in Fig. 3. Fig. 3 is a plan with the parts in the position seen in Fig. 2. Fig. 4 is a side elevation as seen from the left in Fig. 1 and represented partly in section, and Fig. 5 is a plan of the machine as seen in Fig. 4. Figs. 6 and 7 are enlarged axial sections of the blowpipe and plunger detached. Fig. 8 is an end view, and Fig. 9 an axial section, in detail on a large scale of the head of the blowpipe. Fig. 10 is a sectional view of the cover of the mold. Fig. 11 is a sectional view of the funnel for the blowpipe-nozzle. Fig. 12 illustrates a slightly-modified construction of the blowpipe. Fig. 13 illustrates the finishing-mold.

A hollow cross-beam 1 is mounted horizontally on an upright support or standard 2 and carries at each end a molding mechanism. These latter will be alike, and only one is shown in the drawings. The beam 1 is fixed in a bearing-head $1^\times$, which turns about a vertical axis on the standard 2, so that when one molding mechanism gets heated the other may be swung into place for use. On an arm or journal of the beam 1 is rotatively mounted a sleeve 3, which carries the mold. This latter is divided axially into two outer halves or sections 5 and 6, with a cover 7, Fig. 10, and two inner halves or sections 8 and 9, these latter forming the mold proper. The section 5 is rigid or integral with the sleeve 3, and the section 6 is hinged thereto by a pin 10, so that the section 6 may be thrown back to open the mold, as in Fig. 3 and as indicated in dotted lines in Fig. 5. The section 6 when closed is held closed by a lug 11 on the pin 10 engaging a detent 12, Fig. 5, backed by a spring 14 on a pin 13. The cover 7 has a nipple or hollow stem 15, to which is connected a hose 16, fixed at its other end, Fig. 4, in the sleeve 3. The cover 7 is carried by an arm 17, fixed on a rock-shaft 18, about the axis of which the cover may be swung between its two positions indicated by full and dotted lines in Fig. 1. The bearings of the shaft 18 are on the section 5. When the cover 7 is on the mold, it is held in place by a detent 19 engaging with a shoulder or lug 20 on the rock-shaft 18. The detent 19 is backed by a spring $20^\times$. (Seen in Fig. 4.) To disengage the pawls or detents 12 and 19 and allow the mold to open, arms 21 and 22 on the head $1^\times$, Fig. 5, and a swell 24 on a cam 23 on the sleeve 3 are employed. When the sleeve 3, carrying the mold and appurtenances, is rotated in the direction of the arrow in Fig. 1 from the position indicated in this figure, the arm 21 will act on an arm 25 on the detent 12 when about three-fourths of a revolution is reached to shift said detent and permit the mold to be opened. The swell 24 will also impinge upon a crank 27 to shift the detent 19 and allow the cover 7 of the mold to open, and the arm 22 will also impinge upon an arm 28 on the hinge-pin 10 to turn the latter and open the mold.

Compressed air is admitted to the hollow beam 1 by a pipe 29, and the arm or journal of this beam has a conical portion 30, over which the sleeve 3 fits closely, being pressed up thereto by a screw 31. In the conical portion 30, Fig. 4, is a port 32, which when the mold is brought nearly to its upright position (seen in Figs. 1, 4, and 5) is put into coincidence with the air-pipe or hose 16, thus admitting compressed air to the mold through its cover 7; but when the mold is turned downward this connection is cut off and the port 32 is put in communication with a passage 33 in the sleeve 3. This passage 33 leads to a tube 34, which projects from the sleeve, as seen in Fig. 4. On this tube are fixed two forked supports 35 and 36, which carry the blowpipe 37, and on it also is a cross-piece, one arm 38 of which carries a small funnel 39, into which the nozzle 40 of the blowpipe may be inserted. The other arm 41 of said cross-piece embraces a rod 42, provided with a roller 43, which bears on the periphery of the cam 23. The support 35 is fixed on the tube 34, whereas the support 36 and the cross-piece 38 41 is slidable on said tube. The support 36 is moved to and fro by means of a cam-groove 44 in the face of the cam 23, Fig. 1, a stud or roller 45 on a rod 48 engages said groove, and said rod 48 is connected with a side arm 47, projecting from the support 36. The arm 47 is slotted near its inner end and embraces the screw 31 as a guide, and at its outer end, Fig. 3, it is tubular and contains a spiral spring 48, which embraces a reduced part of the rod 42 (extending through the tubular portion of 47) and serves to hold the roller 43 pressed up elastically to the cam 23. The funnel 39 communicates with the tube 34 by a hose 49.

The inner sections 8 and 9 of the mold are provided with end flanges 50, Figs. 2 and 10, which take over and embrace flanges 51 on the respective outer sections 5 and 6 of the mold and hold the inner sections firmly against shifting or displacement. These inner sections of the mold are interchangeable with others adapted exteriorly to fit in the outer mold, but which differ from each other interiorly. The ends of the inner mold are made conical, so as to fit at one end to the conical cover and at the other end to the blowpipe 37, Fig. 2. The cover 7 has in it a check-valve 52, Fig. 10, held closed by a spring and adapted to open inwardly or toward the mold.

Referring particularly to Figs. 6 to 9, the major parts of the blowpipe comprise an inner tube 53 and outer tube-sections 54, 55, and 56. The section 54 is slidable telescopically in the section 55 and the section 56 is slidable on the section 55. The outer end of the inner tube 53, which is terminated by the nozzle 40, is provided with screw-threads having a steep pitch, and it screws through a nut formed at the outer end of the tube-section 54, whereby axial rotation may be imparted to the tube 53 by a sliding endwise movement of the section 54. In addition to the steep-pitched screw-threads at its outer end the tube 53 has at its middle part another screw-threaded portion with a flatter pitch which screws through a nut forming part of the tube-section 55. When the inner tube 53 is rotated by sliding the section 54, the said inner tube will be moved longitudinally in the section 55. This inner tube 53 forms what I call a "plunger" and bears at its inner end (nearest the mold) a tubular threaded plug 57, provided with a valve 58. This plug serves to shape or form, as required, the threaded mouth of the bottle or other article being molded. The inner end of the tube-section 55 is enlarged, Fig. 9, and the end of the slidable section 56 is also enlarged to embrace it. The enlarged head of the tube-section 55 has in it toward its outer end a circumferential recess or groove, and there are a plurality of segments 59, (four, as here shown,) which have each an inturned lip or flange 60 engaging said circumferential groove. These, together with the enlarged end of the tube-section 55, form or determine externally the shape of the rim or head of the article molded. These segments 59 are held pressed inward or down upon the end of section 55 by a spring 61, which embraces the body of the section 55 and is situated between a shoulder on the head of said section and another shoulder on the sliding section 56, the conical extremity of the latter taking over and embracing said segments. If the section 56 be moved to the position seen in dotted lines in Fig. 9, an inner conical surface 62 thereon will impinge upon the angles of the segments 59 and rock the latter so as to open them outward, thereby freeing the article blown from the blowpipe. The tube-section 55 is embraced by the support or fork 35 and the tube-section 54 by the support or fork 36, and a spline 63 prevents the section 54 from turning axially in the section 55. The sleeve 3, with the parts it carries, is turned by means of a suitable handle 64. The forked support 35 bears on a circumferential shoulder on the tube-section 55, and the forked support 36 engages a circumferential groove in the tube-section 54.

When the movable parts are in the position seen in Figs. 2 and 3, which may be considered the starting position, the blowpipe becomes inserted, the parts thereof occupying then the positions seen in Fig. 7. The mold is then turned into the vertical position seen in Fig. 1, the cover 7, released by disengagement of the detent 19, is opened, and the sections of the mold closed. While the mold is being brought to the upright position the cam 23, acting through the rod 46, moves the plunger 53 to the position shown in Figs. 6 and 9. The rod 42 also shifts the funnel 39 to its position on the nozzle 40 of the blowpipe. A suitable quantity of molten glass is now introduced into the mold, the cover 7 put in place thereon, and the mold moved around in the direction of the arrow to the starting position. At the beginning of this movement the inlet for compressed air comes into coincidence with the port 32 and air is admitted to the top of the mold, forcing the glass into the outer end of the blowpipe and forming the mouth of the article. For convenience of illustration the port 32 is represented in Fig. 4 as coinciding with the air-inlet; but as a matter of fact they are not put into coincidence until the sleeve 3 shall have been turned a little. In the continued movement of the said sleeve the air is cut off automatically. When the sleeve 3 shall have been turned until the mold is directly below the axis of rotation, the port 32 is brought into coincidence with the passage 33 and the compressed air then flows through the tube 34 and hose 49 to the funnel 39 and thence through the blowpipe to the other end of the mold, giving to the glass therein the form of a hollow ingot, which expands to fill the mold. By the further continued rotation of the sleeve 3, carrying the mold and other parts, the plunger 53 is withdrawn by the cam 44 and rod 46, the steep-pitched screw on the plunger imparting the proper screw or helical motion to properly withdraw the plug 57 from the glass without injury to the threads. The rod 42 and funnel 39 are simultaneously moved outward by the cam 23, thus making room for the outward movement of the plunger 53. To facilitate the turning of the plunger, a rotatable bush 65, Fig. 11, is fitted in the funnel 39 to receive the nozzle 40. During the last quarter of the rotation of the parts, counting from the position seen in Fig. 2, the mold is opened by the arm 22, so that when a full rotation is completed the ingot will lie free in the mold, so that it may be lifted out by the blowpipe, the latter being free to be lifted from the forked supports 35 and 36.

The ingot, which is held in place on the blowpipe by the segments 59 embracing it just behind the rim or band on the ingot, is now carried to the divided finishing-mold (seen in Fig. 13) and which may be of the usual kind.

After being removed from the finishing-mold the article is disengaged from the blowpipe by opening the segments 59, as described above. The valve 58 opens to permit the air to flow to the mold, but prevents the glass from being forced into the tubular bore of the plunger. It should be noted here that the cam 44 has such a form that the plug 57, which is slightly tapered at the end, is withdrawn a little before the air is admitted through the blowpipe, so that the bottle rim or head may not crack from shrinking while solidifying. This prevents also any deformation of the rim.

It will be noted from the above description that apart from the manipulation of the mold-cover and the blowpipe the operations are wholly automatic and the attendant has only to rotate the mechanism.

The mold-cover may be closed either by hand or automatically.

In order that the sleeve 3 may be held in its two positions—the positions seen in Figs. 1 and 2—a spring-detent (seen in Fig. 3) is employed. This consists of a spring 66 on the bearing $1^x$, carrying a roller 67, which rolls on a flange 68 on the sleeve, there being two recesses in this flange for the roller to drop into or engage. This roller does not prevent the rotation of the mechanism by the attendant.

In the manufacture of bottles or the like where the neck-opening or mouth is smooth or without a screw-thread no rotary movement of the tube or plunger 53 in the blowpipe is required and no threads are therefore needed on said tube, the tube 54 being, moreover, omitted and the fork 36 arranged to grasp directly around the tube 53 for direct longitudinal shifting of the latter by means of the rod 46. The construction of the blowpipe in said case is illustrated in Fig. 12, which will be readily understood without further explanation. The cam-groove 44 must of course in this case have a corresponding suitable shape, so that the movement of tube 53 will approximately equal the length of plug 57. The tube 34 may as regards the support formed by it for the blowpipe be considered as an arm projecting from the sleeve 3 and from which project at an angle the forks or supports carrying the blowpipe.

An important advantage due to the machine above described is that it enables the part of the work best adapted for execution by mechanical means—namely, the formation of the hollow ingot with the mouth or head—is given to the machine to perform, while the finishing is done by hand. The operation of the machine is such that it will supply several workman at the finishing-molds.

I do not in this application claim the method of operation, as this is embodied in another application filed by me January 17, 1900, under the serial number 1,803.

Having thus described my invention, I claim—

1. In a machine for the purpose specified, the combination with an upright support, and a hollow arm on said support, said arm having an inlet for compressed air and an outlet-port therefor, of a sleeve rotatable on said arm, a sectional mold carried by said sleeve, a blowpipe removably mounted on the sleeve and fitting onto one end of the mold, and two conduits leading from said sleeve and extending, one to the opposite end of the mold to that where the blowpipe is connected and the other to the outer end of the said blowpipe, said conduits having their receiving ends so situated as to be put automatically into coincidence with said outlet-port in succession by the rotation of said sleeve.

2. In a machine for the purpose specified, the combination with an upright, and a hollow cross-beam rotatable about a vertical axis on said beam, said beam having an inlet for compressed air, two arms, and an outlet-port in its arm for the compressed air, of a sleeve rotatable on the arm of the cross-beam, a blowpipe removably mounted on said sleeve, a sectional mold carried by said sleeve, and conduits leading from said sleeve to the opposite ends of said mold, said conduits having their receiving ends so situated as to be put automatically into coincidence with said outlet-port in succession by the rotation of said sleeve.

3. In a machine for the purpose specified, the combination with an upright support, a hollow, laterally-projecting arm thereon, said arm having an inlet for compressed air and an outlet-port therefor, a sleeve rotatively mounted on said arm, said sleeve having two ports adapted to be put into coincidence with the outlet-port in the arm at different points in the rotation of the sleeve, a sectional mold carried by said sleeve, and a conduit connecting the cover end of said mold with one of the outlet-ports in said sleeve, of a blowpipe, carried by the sleeve and readily removable therefrom, said blowpipe forming a part of that end of the mold opposite to the cover end thereof, and a conduit connecting the other outlet-port in the sleeve with said blowpipe, whereby compressed air is admitted automatically to opposite ends of the mold successively, by the rotation of said sleeve.

4. In a machine for the purpose specified, the combination with a substantially horizontal arm, the sectional mold, rotatable about said arm, said mold provided with a hinged cover and having one of its sections hinged, detents which hold the said cover and section of the mold closed, and stationary means, substantially as described, which displace said detents automatically when the mold is rotated about said arm, thereby opening the mold.

5. In a machine for the purpose specified, having an upright support, a hollow arm on said support, said arm having an inlet and an outlet port for compressed air, a sleeve rotatable on said arm, and a sectional mold carried by said sleeve, of a blowpipe removably mounted on the sleeve and fitting to one end of said mold, said blowpipe having a nozzle 40 at its other end, the funnel 39, to fit up to said nozzle, an air-conduit connected to the funnel for supplying compressed air to the mold through the blowpipe, the rod 42, which supports the funnel, means for imparting an endwise movement to said rod, and means actuated by the rotation of said sleeve for automatically admitting air to the mold, substantially as set forth.

6. The combination with a rotatable, sectional, ingot-mold, and a blowpipe, the head of which fits into and forms a part of said mold, of automatic means for admitting compressed air first to the end of said mold opposite to the blowpipe, and automatic means for admitting compressed air subsequently to the mold through said blowpipe, substantially as and for the purposes set forth.

7. The combination with an ingot-mold, of a blowpipe, the head of which forms a part of the mold, said blowpipe having in it a tubular plunger 53 movable endwise, and means for operating said plunger, substantially as set forth.

8. The combination with the ingot-mold, of the blowpipe, the head of which forms a part of said mold, said blowpipe having an interiorly-situated plunger, movable helically and provided with a screw-shaped plug 57, and automatic means for operating said plunger, substantially as set forth.

9. The combination with an ingot-mold, of a blowpipe, the end of which forms a removable part of said mold, said blowpipe having a tubular plunger 53, provided with a spiral plug 57, the inclosing tube 55, and the slidable tube 56, embracing the plunger and having a nut through which screws a steep-pitched screw on the plunger, said tube 55 having a nut through which screws another screw-thread on the plunger, substantially as set forth.

10. The combination with an ingot-mold, of a blowpipe, the end of which forms a removable part of said mold, said blowpipe having a tube 55, movable segments 59, on said tube 55, an embracing-tube 56, slidable on the tube 55, and having an inclined or conical inner surface 62, for opening said segments, a spring 61 between the tubes 55 and 56, and a tubular plunger 53, having a plug to form the inner surface of the neck or mouth of the article molded, said plunger being movable longitudinally in the tube 55, substantially as set forth.

11. The combination with the ingot-mold, of the blowpipe detachably applied to said mold, said blowpipe having movable segments 59, the inner faces of which shape the outer surface and contour of the bead about the mouth of the article molded and take over said bead for holding said article, and having means for spreading said segments to free the blowpipe from the finished article, substantially as set forth.

12. The blowpipe, comprising an inner tube provided with a plug to shape the inner surface of the mouth of the article molded, a check-valve in said plug, a tube 55, having at its end a hollow head which incloses said plug, the inner surface of said hollow head shaping the outer surface of the mouth of the article, movable segments 59, which secure the blowpipe to the article molded, and means for operating said segments to set free the finished article, substantially as set forth.

13. The blowpipe, comprising the inner tube 53, having a plug at its extremity, the inclosing tube 55, having an enlarged, hollow head embracing said plug and provided with a circumferential groove, the movable segments 59, grouped about said hollow head and having parts 60 engaging said circumferential groove, the outer tube 56, having a hollow head embracing the said segments and provided with inner conical faces, one for closing and the other for spreading said segments, and the spring 61, for holding said segments closed, substantially as set forth.

14. An axially-divided, sectional ingot-mold, comprising the outer sections, 5 and 6, and the inner sections, 8 and 9, said outer sections having flanges 51, and said inner sections having flanges 50, which take over the flanges 51 and prevent movement of the inner sections on their respective outer sections, substantially as set forth.

15. The combination with a sectional ingot-mold, of air-conduits leading to the respective ends of the mold, one of said conduits including a detachable blowpipe and the other being a hose connected to the cover of the mold, check-valves at the respective air-inlets to the mold, and automatic means for admitting compressed air to the mold alternately through said conduits, substantially as set forth.

16. In a machine for the purpose specified, the combination with a hollow arm to support the mold, said arm having an inlet for compressed air, a sleeve 3, rotatable on said arm and provided with two air-receiving ports adapted to be put alternately into coincidence with an outlet-port in said arm, a sectional ingot-mold carried by said sleeve and having a cover with an air-inlet, a conduit extending from said air-inlet in the cover to one of the receiving-ports in the sleeve, a carrier for the blowpipe, extending from and carried by said sleeve and having on it forked supports for the blowpipe, the said blowpipe, having one end fitted to the mold, a funnel 39, adjacent to the outer end of the blowpipe, and a conduit connecting said funnel with one of the ports in said sleeve, the blowpipe being capable of ready removal from the machine, substantially as set forth.

17. In a machine for the purpose specified, the combination with a fixed arm forming a journal, of a mold-carrier rotatable about said arm, automatically-controlled means for admitting compressed air alternately to the opposite ends of the mold as it is rotated, and means for holding the mold-carrier yieldingly in its two positions, substantially as set forth.

18. In a machine for the purpose specified, the combination with the fixed, upright standard 2, having in its upper end a socket, of the head $1^\times$, of a T shape and having a journal to fit in the upright socket of the standard and the cross-bar 1, fixed in said head in a position at right angles to the axis of said journal, of a mold-support rotatively mounted on said cross-bar, and an ingot-mold on and carried by said support, substantially as set forth.

19. The combination with the hollow transverse bar or arm 1, having a conical shoulder, the sleeve 3, rotatable thereon and having a conical surface to fit that on the bar, and a screw for setting these surfaces together hermetically, said bar or arm having an inlet for compressed air and an outlet-port in said conical surface, and said sleeve having two ports in its conical surfaces adapted to be put into coincidence with the port in the arm alternately by the rotation of said sleeve, substantially as set forth.

In witness whereof I have hereunto signed my name in the presence of two subscribing witnesses.

CHRISTIAN CHRISTIANSSON.

Witnesses:
A. L. HAMMARBACK,
KARL LINDEBORG.